UNITED STATES PATENT OFFICE.

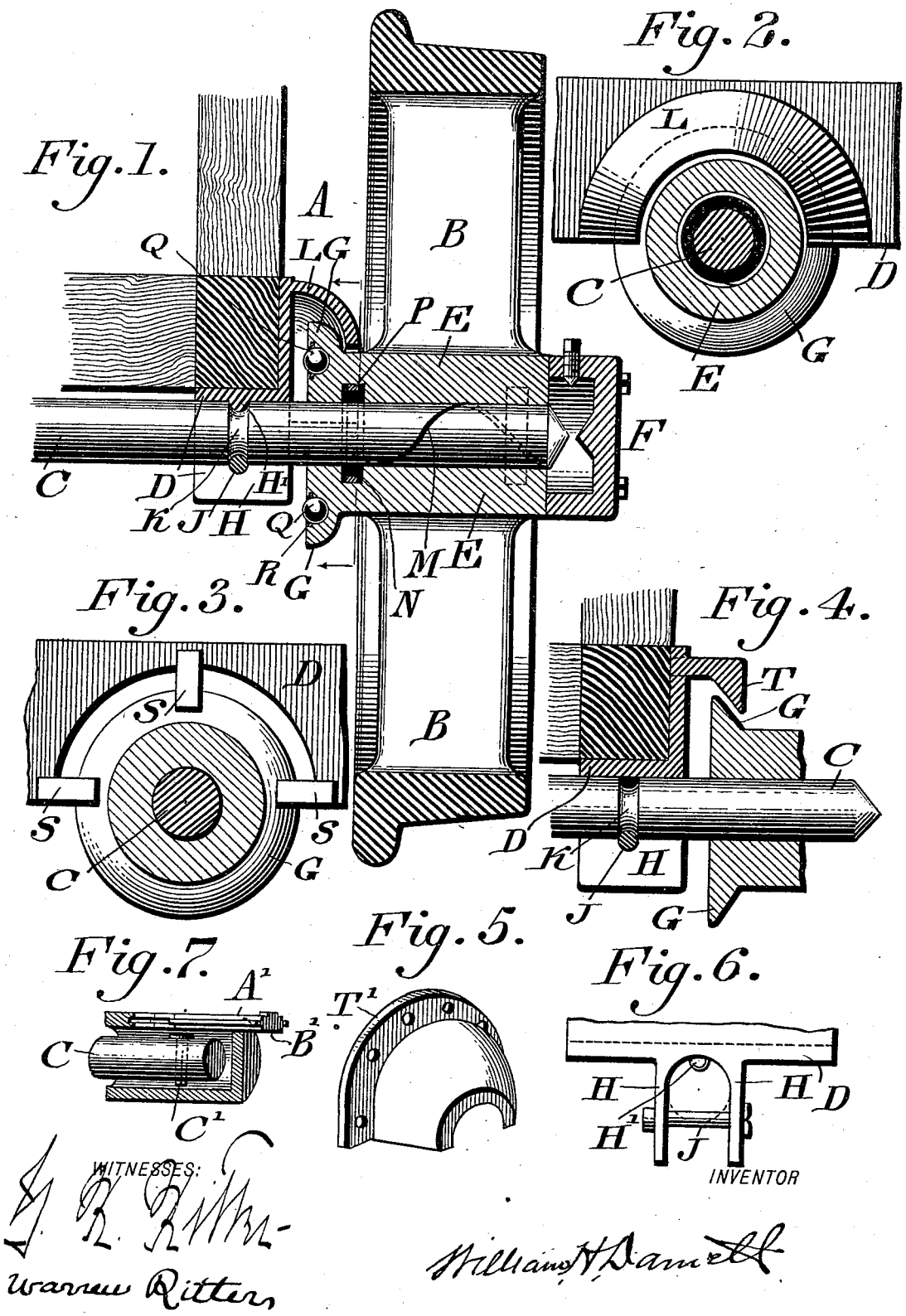

WILLIAM H. DANIELL, OF PHILADELPHIA, PENNSYLVANIA.

RUNNING-GEAR FOR CARS.

SPECIFICATION forming part of Letters Patent No. 518,752, dated April 24, 1894.

Application filed May 29, 1893. Serial No. 475,974. (No model.)

*To all whom it may concern:*

Be it known that I, WILLIAM H. DANIELL, a citizen of the United States, residing at Philadelphia, in the county of Philadelphia and State of Pennsylvania, have invented certain new and useful Improvements in Running-Gear for Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists of an improvement in running gear for cars whereby a horizontal movement on the axle is permitted to the wheels, so that, owing to the irregularities of the track, straining, rocking or swaying of the cars is prevented.

It further consists in providing means for securing the wheels of a car or the easy removal thereof.

Figure 1 represents a sectional view of a running gear of a car embodying my invention. Fig. 2 represents a section on the line *x x* Fig. 1. Figs. 3, 4 and 5 represent modifications of a part of the device. Fig. 6 represents an end view of a journal box employed. Fig. 7 represents a perspective section of a part of my device.

Similar letters refer to corresponding parts in the various figures.

Referring to the drawings—A designates a running gear for a car formed of a wheel B on an axle C which is journaled in the box D. E designates the hub of said wheel and to one end of said hub E is secured, in any suitable manner, the oil cup F, and the other end is provided with a flange or shoulder G.

The journal box D is secured to the car by proper means and is formed of the side pieces H, which are adapted to support a pin J, the latter being locked or fastened in said side pieces H. The journal box is provided with a boss or pin H'. A groove, K, is provided in the axle C, in which groove said pin J and boss H' rest whereby the axle will be prevented from displacement and will be securely held.

Situated at the upper part of the box D is a hood L, which is adapted to embrace the flange, G, of the hub E, (as shown in Figs. 1 and 2) and against which, said flange, G, bears, whereby the wheel B is prevented from leaving the axle.

A groove, M, is provided in the axle C, which connects with the oil cup F and in order to prevent the escape of the oil, the packing N, is provided, which is forced against the said axle C by means of a spring, P, whereby a continuous bearing, on the axle C, will result, as the packing wears away.

The inner face of the hub E is provided with ball-bearings, Q, which are held in place by the spring, R, so that but little friction will result when the hub E moves on the axle C and contacts with the wall of the journal box.

In lieu of the hood shown in Figs. 1 and 2, I may use blocks S (as shown in Fig. 3) which act in the same manner as the hood, and if desired spikes T may be employed (as shown in Fig. 4) or the hood may be made separate from the journal box and by means of a rim T' be secured thereto (as shown in Fig. 5.) The shape of the flange, G, in each case may be varied as required.

A' designates a covering for the end of the axle C said covering being provided with a slide B' whereby the axle may be reached. By this means a pin C' may be inserted in the axle and the slide closed, whereby the pin will be held in place, it being evident that easy and rapid insertion or withdrawal of the pin may be accomplished.

The operation of the device is as follows, the wheel B is in its normal position, as shown in Fig. 1—the hood L bearing against the flange G and retaining the wheel on the axle C but when the gage of the track varies the wheel B will move on the axle C, being permitted to do so by the space between the hub of said wheel and the journal box D, the wheel again returning to its normal position after the inequalities of the track have been passed. If it is desired to remove a wheel for any purpose the same may be easily accomplished, the car is slightly raised and the pin J, removed from the side pieces H and the axle no longer supported will leave the journal box and the hood L releasing the flange G, the wheel may be taken off. A similar operation may be employed to mount the wheel.

What I do claim as my invention, and desire to secure by Letters Patent, is—

1. A running gear for cars having an axle mounted in a journal-box which is formed of side pieces and a pin passing through the same and below said axle substantially as described.

2. A running gear for cars having an axle, a groove therein, a journal box formed of side pieces and a pin passing through said side pieces and below said axle said pin entering said groove substantially as described.

3. A running gear for cars having an axle and a wheel mounted thereon, a flange on the hub of said wheel, a journal-box and a hood forming part of said journal box and loosely engaging said flange substantially as described.

4. A running gear for cars having an axle a journal box in which said axle is mounted, a wheel on said axle a flange on the hub of said wheel and a hood forming part of the journal box and adapted to engage said flange substantially as described.

5. A running gear for cars consisting of a journal box formed of side pieces, a pin secured to the same, a hood on said box, an axle having a groove, mounted in said journal box and a wheel on said axle, the hub on said wheel being provided with a flange which is adapted to be engaged by said hood, said parts being combined substantially as described.

6. A running gear for a car having a journal box formed of side pieces, a pin secured to the same, an axle mounted in said box a wheel on said axle said wheel being provided with a flange and a hood on said box which is adapted to engage said flange substantially as described.

7. A running gear for cars having a journal box with a boss and a pin, an axle mounted in said box and having a groove into which said boss and pin are adapted to enter substantially as described.

8. A running gear for cars having a journal box with a boss, an axle mounted in said box having a groove into which said boss is adapted to enter substantially as described.

9. A running gear for cars having a journal box, an axle, a hood on said journal box, a wheel with a flange and balls on the inner face of the hub of said wheels said balls being held by springs substantially as described.

10. A running gear for cars having a journal box, an axle, a wheel, an oil cup, a groove in said axle, one end of which communicates with said oil cup and packing at the other end bearing on said axle by means of a spring substantially as described.

In testimony whereof I affix my signature in presence of two witnesses.

WILLIAM H. DANIELL.

Witnesses:
WILLIAM ROBERTS,
DANIEL HOLLOWAY.